United States Patent

Herman et al.

[15] 3,682,386
[45] Aug. 8, 1972

[54] FILTER FOUNTAIN

[72] Inventors: Lawrence Herman, 108 West End Avenue, New York, N.Y. 10023; Marvin Rechter, 3 Harbor View West, Lawrence, N.Y. 11559

[22] Filed: July 24, 1970

[21] Appl. No.: 57,943

[52] U.S. Cl. .................239/25, 210/266, 210/318, 210/418, 210/460
[51] Int. Cl. .............................................B01d 35/02
[58] Field of Search.............210/266, 318, 418, 460; 239/25

[56] References Cited

UNITED STATES PATENTS 3,030,029 4/1962 Slater, Jr. ...................239/25
1,050,971 1/1913 Meacham................239/25 X
1,395,321 11/1921 Williams.....................239/25

Primary Examiner—Samih N. Zaharna
Attorney—Kenneth S. Goldfarb

[57] ABSTRACT

A fountain for supplying filtered water from a water tap comprising a main body and a filter container rotatably secured to the main body. The main body is provided with a screen for building up back pressure so as to direct water through a valve controlled bore into the filter container after which the water passes through charcoaled filtering material and through an outlet. The container is rotatable from a position where the outlet is uppermost for use as a drinking fountain to a reverse position where the outlet extends downwardly for filling a tumbler or other desired vessel with filtered water.

2 Claims, 4 Drawing Figures

PATENTED AUG 8 1972 3,682,386

FILTER FOUNTAIN

This invention relates to a filter fountain for connection to a bathroom water tap or the like for use in purifying and filtering the tap water and for use either as a drinking fountain or for filling a tumbler or like vessel.

In the past, various adapters have been used in conjunction with water taps for providing a drinking fountain or for attempting to filter or purify the water from the tap. The present invention has the further advantage over other devices inasmuch as it may be conveniently secured to any conventional water tap and may be allowed to remain thereon while the filtering material is being replaced and which is so arranged as to facilitate the discharge of the filtering material.

A further constructional feature of the invention is the rotational mounting of the filter container with respect to the main body of the filter together with valve means so arranged as to control the fluid flow through the filter means to an optimum degree.

Still further objects and features of this invention reside in the provision of a filter fountain that is simple in construction, capable of being manufactured from readily available materials, which is easy to use and operate, and which is especially effective in removing impurities in the water from a water tap.

These, together with the various ancillary objects and features of the present invention, which will become apparent as the following description proceeds, are attained by this filter fountain, preferred embodiments of which are illustrated in the accompanying drawing, by way of example only, wherein.

Figure 1:
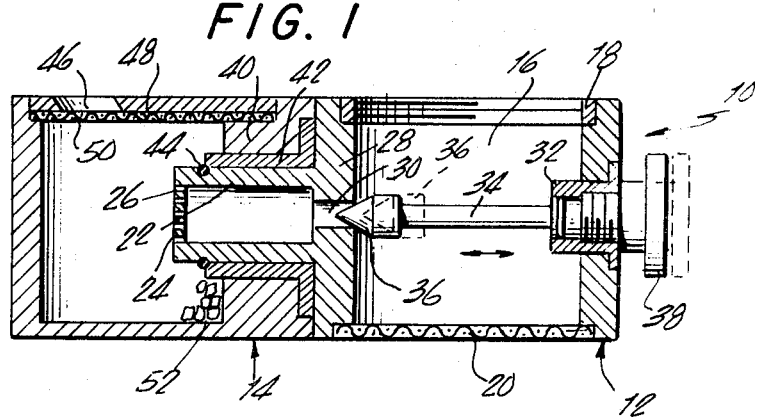
FIG. 1 is a longitudinal sectional view of a filter fountain constructed in accordance with the concepts of the present invention.
Figure 2:
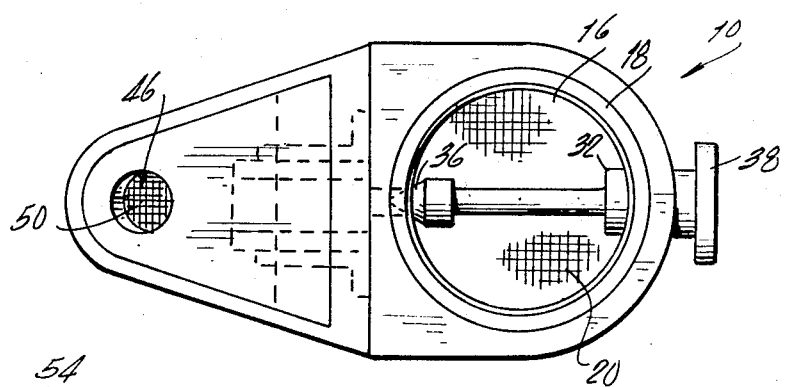
FIG. 2 is a top plan view of the filter fountain.

With continuing reference to the accompanying drawing, wherein like reference numerals designate similar parts throughout the various views, reference numeral 10 generally designates a filter fountain constructed in accordance with the concepts of the present invention. The filter fountain includes two main parts, a main body 12 and a filter container 14. The main body 12 is hollow having a central cavity 16 and is open at the top and provided with any suitable means 18 such as a threaded retainer for securing the filter fountain 10 to a bathroom water tap or like outlet for receiving a supply of water. The bottom of the main body 12 likewise has an opening therein closed by a screen 20. This screen is of such a mesh as to provide suitable resistance to fluid flow whereby a desired amount of back pressure will be built up. Integrally formed with the main body 12 is a tube 22 having an end wall 24 provided with a series of strainer holes 26 therein. The side wall 28 of the main body 12 is provided with a bore 30 therethrough. The bore 30 is in alignment with the tube 22.

A bushing 32 provides means for threadedly journalling a needle valve assembly 34 in the main body, the needle valve assembly 34 includes a conical valve head 36 adapted for closing or partially closing the bore 30 for controlling fluid flow from the main body cavity 16 through the bore 30. An operating handle 38 is mounted outwardly of the main body 12 and upon rotation advances or retracts the valve head from the position as shown in phantom lines to the position as shown in solid lines.

Figure 4:
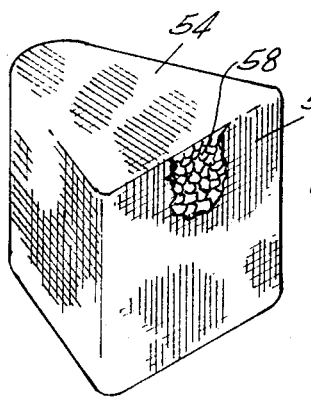

The filter container 14 has an opening in its side wall 40 and a bushing 42 is provided for rotatably mounting the filter container 14 on the tube 22. An O-lock ring 44 is used to firmly hold the filter container 14 in abutting relationship with the main body 12. The filter container 14 may be provided with an outlet 46 therein and may include a relatively large top closure plate 48 secured in any suitable manner to the container 14 such as by locking detents, not shown, or the like. Of course, the size of the closure plate 48 is optional. A screen 50 is provided for retaining the charcoal filtering material 52 within the filter container 14 and is of a suitable mesh to do so. The screen 50 may be formed integrally with the plate 48. The charcoal filtering material may be loose granules of charcoal which have been activated for optimum filtering of water from the tap or may be, as shown in FIG. 4, in a carriage 54 including an outer screen 56 filled with charcoal granules 58.

In use, with the filter fountain connected to a water tap, the water tap is turned on. The flow downwardly of water through the screen 20 will cause a back pressure. Adjustment of the needle valve assembly 34 will permit fluid flow through the bore 30 and thence through the filter material 52 and upwardly through the outlet 46 to provide a drinking fountain of especially pure and palatable filtered water. When it is desired to fill a tumbler with filtered water, the filter container 14 can be rotated to a position with the outlet 46 extending downwardly. Closing of the bore 30 will cause all of the water from the tap to pass through the screen 20 as when it is desired to obtain water for cleansing and scrubbing purposes or external use, thus extending the life of the filter material when filtered water is not needed.

When it is necessary or desirable to replace the filtering material, this may be easily accomplished. With the top plate 48 removed and the filter container 14 in its inverted position, all of the to-be-replaced charcoal filter material can be easily and speedily washed out of the filter container. Then the filter container 14 can be positioned in its upright attitude, new charcoal filtering material added, and the top plate 48 placed and locked in position.

Figure 3:
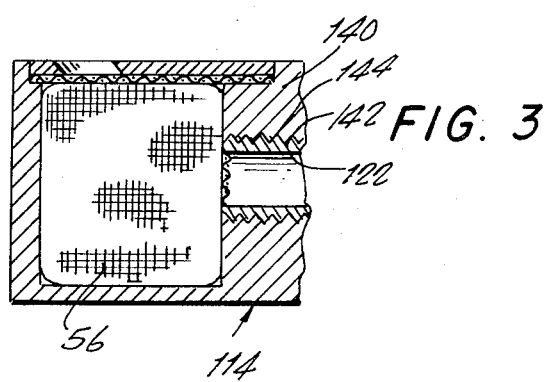
FIG. 3 is a sectional detail view illustrating a modified form of the invention; and, FIG. 4 is a perspective view of a filter cartridge which may be used as in an alternate form of the invention.

A shown in FIG. 3, in lieu of the lock ring 44 and the bushing 42, the tube 122 may be externally threaded at 142 and the side wall 140 of the filter container 114 may be internally threaded as at 144 for securement in a rotational manner of the filter container 14 to the main body. In this form of the invention the cartridge 56 is shown in position.

A latitude of modification, substitution and change is intended in the foregoing disclosure, and in some instances some features of the present invention may be employed without a corresponding use of other features.

I claim:

1. A fountain for supplying filtered water from a water tap comprising a main hollow body, means on said body for attachment to a water tap, a discharge opening at the bottom of said body, screen means closing said opening for providing back pressure, said body having a bore therein and having a discharge tube aligned therewith, a filter container rotatably disposed on said tube abutting said body, said container having an outlet therein, filter means in said container for filtering water fed thereto, and valve means cooperating with said bore for controlling fluid flow into said container, said bore extending horizontally, said tube extending into said container, said container being movable from a position wherein said outlet is at the top for use as a drinking fountain to a position where said outlet is at the bottom for use in filling a vessel with filtered water.

2. A fountain according to claim 1, wherein said container is threadedly secured on said tube, a first screen in alignment with said tube, a further screen in alignment with said outlet, said filter means including a screen enclosed cartridge filled with charcoal.

* * * * *